(12) United States Patent
Berger (10) Patent No.: US 7,203,132 B2
(45) Date of Patent: Apr. 10, 2007

(54) REAL TIME ACOUSTIC EVENT LOCATION AND CLASSIFICATION SYSTEM WITH CAMERA DISPLAY

(75) Inventor: Theodore W. Berger, Rancho Palos Verdes, CA (US)

(73) Assignee: Safety Dynamics, Inc., Tucson, AZ (US)

( * ) Notice: Subject to any disclaimer, the term of this patent is extended or adjusted under 35 U.S.C. 154(b) by 0 days.

(21) Appl. No.: 11/279,079

(22) Filed: Apr. 7, 2006

(65) Prior Publication Data
US 2006/0256660 A1     Nov. 16, 2006

Related U.S. Application Data

(60) Provisional application No. 60/669,287, filed on Apr. 7, 2005.

(51) Int. Cl.
*G01S 3/80* (2006.01)
(52) U.S. Cl. .................. 367/129; 367/124; 367/906
(58) Field of Classification Search ................ 367/124, 367/127, 129, 906
See application file for complete search history.

(56) References Cited

U.S. PATENT DOCUMENTS

| | | | |
|---|---|---|---|
| 5,455,868 A | 10/1995 | Sergent et al. ............... 381/56 |
| 5,586,086 A | 12/1996 | Permuy et al. ............. 367/127 |
| 5,703,835 A | 12/1997 | Sharkey et al. ............. 367/124 |
| 5,764,858 A | 6/1998 | Sheu et al. ................... 395/22 |
| 5,831,936 A | 11/1998 | Zlotnick et al. ............. 367/124 |
| 5,917,775 A | 6/1999 | Salisbury ...................... 367/93 |
| 5,973,998 A | 10/1999 | Showen et al. ............. 367/124 |
| H1916 H | 11/2000 | Hollander ................... 367/118 |
| 6,178,141 B1 | 1/2001 | Duckworth et al. ........ 367/127 |
| 6,185,153 B1 | 2/2001 | Hynes et al. ............... 367/124 |
| 6,281,792 B1 | 8/2001 | Lerg et al. .................. 340/540 |
| 6,363,369 B1 | 3/2002 | Liaw et al. ................... 706/15 |
| 6,552,963 B2 | 4/2003 | Baranek et al. ............. 367/136 |
| 6,643,627 B2 | 11/2003 | Liaw et al. ................... 706/22 |
| 6,847,587 B2 | 1/2005 | Patterson et al. ........... 267/127 |
| 6,965,541 B2 | 11/2005 | Lapin et al. ................ 367/118 |
| 2005/0237186 A1* | 10/2005 | Fisher et al. ........... 340/539.22 |
| 2006/0114749 A1* | 6/2006 | Baxter et al. ............... 367/128 |
| 2006/0161339 A1* | 7/2006 | Holmes et al. ............. 701/207 |

OTHER PUBLICATIONS

Namarvar et al., "An efficient training algorithm for dynamic synapse neural networks using trust region methods", Neural Networks, 16 (2003) pp. 585-591.*

* cited by examiner

*Primary Examiner*—Ian J. Lobo
(74) *Attorney, Agent, or Firm*—Hayes Soloway P.C.

(57) ABSTRACT

An acoustic event location and classification system comprising an array of at least two acoustic transducers arranged spaced from one another; a central data processing unit for receiving signals from the acoustic transducers and processing the signals to determine a event type and location; and an internet or LAN connection for transmitting event type and location data to a third party, wherein the central data processing unit uses a DSNN to determine the event type and generalized cross correlation functions between microphone pairs to determine the event location.

7 Claims, 8 Drawing Sheets

REAL TIME ACOUSTIC EVENT LOCATION AND CLASSIFICATION SYSTEM WITH CAMERA DISPLAY

CROSS-REFERENCE TO RELATED APPLICATION

This application claims priority from U.S. Provisional Application Ser. No. 60/669,287 filed Apr. 7, 2005.

FIELD OF THE INVENTION

The present invention relates to a system and a method for identifying and locating an acoustic event and providing evidence as to the source of that event. The invention has particular utility as a system for identifying an explosive event, e.g., a gunshot, at a remote location and determining a location of the gunshot, time the gunshot occurred, and identity of the source of the gunshot, e.g., weapon type, weapon caliber, shooter, etc., using a neural network and a triangulation method which runs on a Digital Signal Processor which displays the results of the data acquisition and calculations in real time, and will be described in connection with such utility, although other utilities are contemplated.

BACKGROUND OF THE INVENTION

In general there is a long felt need for a system and method to identify and locate the exact location of the source of gunfire and a shooter's identity, particularly in a military or urban setting. In many large cities, gun related violence has become a plague of epidemic proportions. It is estimated that roughly 10,000 Americans die each year from gun related injuries, and over 200,000 are non-mortally injured by gunfire. Recent events such as the urban warfare in Iraq and the so-called "Suburban Sniper" in the Washington D.C. area have further underscored the need for a system that can accurately identify and locate the source of gunfire and provide evidence as to the identity of the shooter. Unfortunately many of the prior art devices are inadequate to locate and identify the source of gunfire or shooter in any meaningful way, lack portability necessary for military operations, and are too costly to gain acceptance by communities or the military as a tool to combat crime and aid in warfare, respectively.

In a typical gunshot locating system, a plurality of sensors are situated in the field, usually at regular intervals, along an x-y grid. Each sensor includes a microphone and typically, an amplifier, to produce an audio signal. The audio signal is then carried by a dedicated telephone line to a central location where the sound is processed. Upon detecting a gunshot from the processed audio, relative times of arrivals at the central location are processed to determine a location of the source of the gunshot. These types of gunshot locating systems are described in U.S. Pat. No. 5,973,998 to Showen et al. and U.S. Pat. No. 6,552,963 to Baranek et al.

Showen et al. teaches a gunshot locating system that employs sensors, e.g. microphones, which are permanently placed at a density of roughly six to ten sensors per square mile. Each of these sensors requires a dedicated phone line to transmit sound data to a central data processing center for signal processing. The central data processing center determines whether a gunshot has been fired and the location of the gunshot. Similarly, Baranek et al. discloses a gunshot locating system that is essentially a hard wired alarm system. The alarm system includes a gunshot detector comprising a transducer for detecting sound that is connected to an amplifier, a signal filter and to a transceiver for communicating with a central data processing center. However, neither Showen et al. nor Baranek et al. teach a method of processing acoustical gunshot data to determine the type of weapon used to fire the gunshot and using a video camera and video signals to locate a shooter. Furthermore, neither Showen et al nor Baranek et al. teach a gunshot locating system that is portable.

U.S. Pat. No. 6,847,587 to Patterson et al. teaches a gunshot location device that also includes a microphone, a processor for discriminating between acoustic events, a synchronized clock, and an interface for communicating with a network. However, Patterson et al improved upon the systems of Showen et al and Barank et al. by providing an array of sensors that both located the source of the gunshot and also compared the acquired data with sound data to determine the weapon used. But, the system of Patterson still lacks the portability required to make a gunshot location device practical in military operations, and the system doesn't offer any mechanism for correcting signal processing errors, e.g., false positive gunshot signals or inaccurate weapon determinations.

Therefore, a gunshot locating system that is small enough to be portable and can accurately identify the source of the gunshot is a much needed improvement over the art.

SUMMARY OF THE INVENTION

The gunshot location device of the instant invention detects, localizes and classifies gunshot sounds using a plurality of acoustic transducers in an array. Preferably, the array comprises four acoustic microphones arranged in a rectangular tetrahedral array, equi-spaced from one another at a distance less than about 1.2 feet apart. A neural network classifier is used to classify the caliber of the gun which was used in the firing and filter out all other noise sources. Azimuth and elevation of the gunshot source is calculated from the generalized cross-correlation functions computed for three pairs of sensors. The gunshot location data is sent to a video camera which orients itself towards the gunshot source. A live picture of the area is streamed wirelessly to a display monitor in the dispatch center. Latitude and longitude data of the gunshot source and a date-time stamp are sent to the dispatch center via an Internet link. The gunshot incident and its time amplitude waveform are logged onto the nonvolatile memory of the Digital Signal processor. The log can be retrieved remotely for interpretation of the gunshot incident.

DETAILED DESCRIPTION OF THE PREFERRED EMBODIMENTS

The invention provides improvements over the art by using fewer, more closely spaced acoustic transducers, for acquiring the source of an acoustic event such as a gunshot and employing a neural network that can be trained to accurately identify the source of the acoustic event. These features will be described with more particularity in FIG. 1 through FIG. 5 below.

Figure 1:
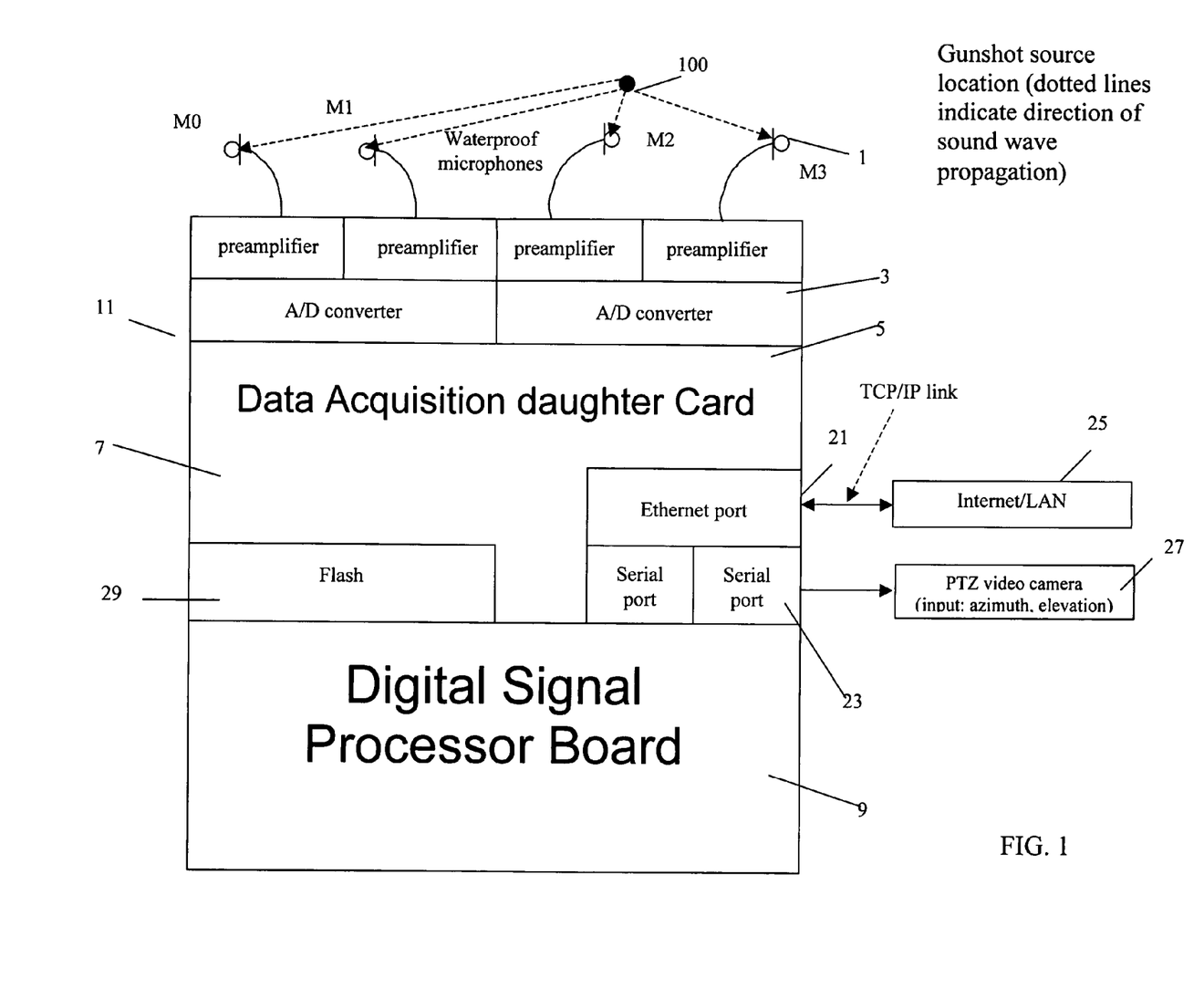
FIG. 1 is a schematic of the gunshot locating system according to the instant invention.
Figure 3:
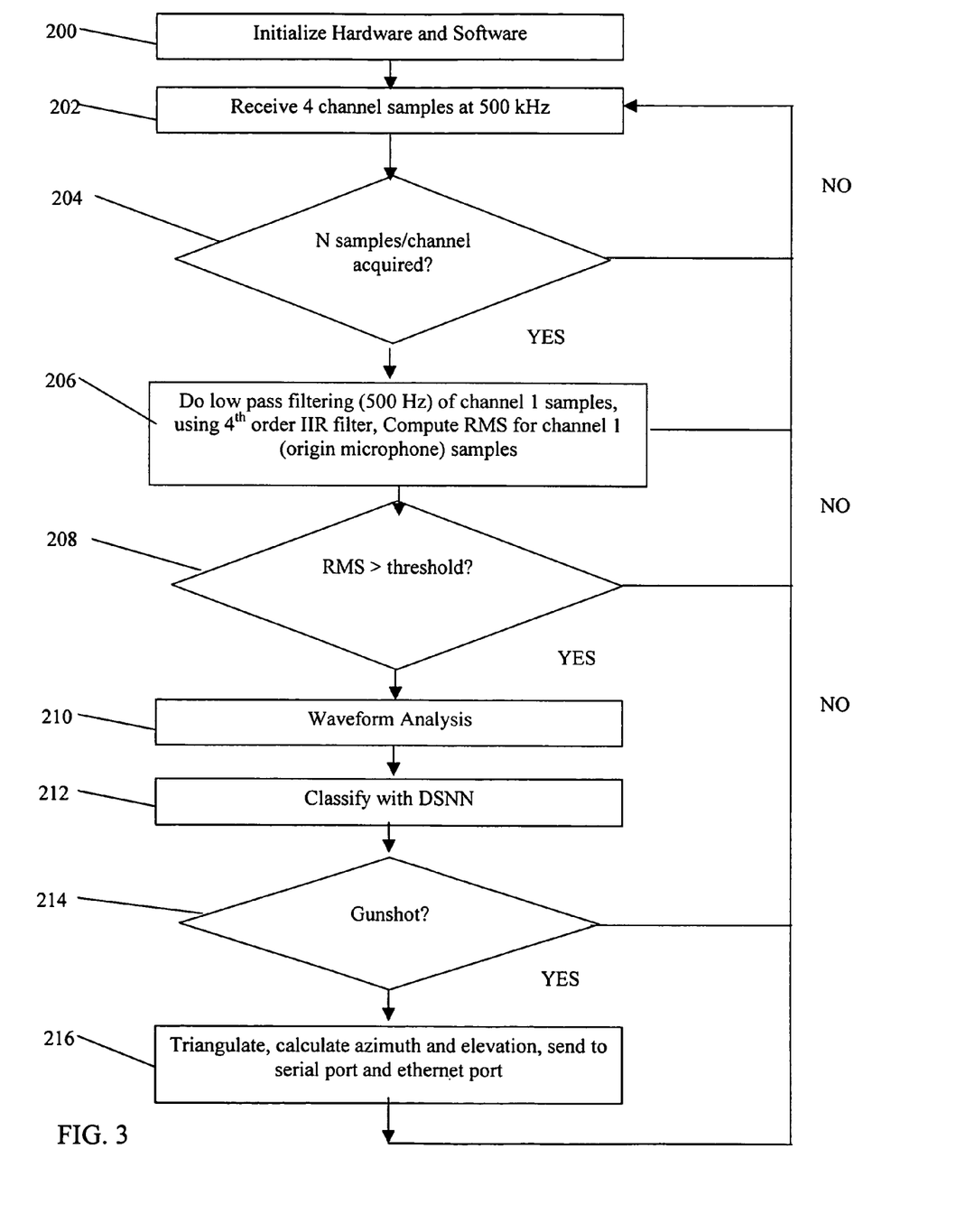
FIG. 3 is a flow diagram of the procedure used for detecting, classifying, localizing and displaying gunshots according to the present invention.

A gunshot locating device according to one preferred embodiment of the invention described in FIGS. 1 and 3 includes a sensor array 1 for sensing an acoustic event. The sensor array comprises acoustic transducers e.g., microphones, that are placed less than 1.2 feet apart from each other on the vertices of a rectangular tetrahedron. Optimally, four waterproof microphones are used to detect the acoustic signals, with one microphone being the origin microphone, two microphones being the periphery microphones and lying on the base of the rectangular tetrahedron and the fourth microphone lying directly above the origin microphone. In addition, each acoustic transducer can be mounted to supporting arms, made for example of plexiglass, steel, copper, or aluminum, to aid in the portability of the sensor array. Alternatively the entire sensor array can be mounted to a person, e.g., a soldier's helmet.

Acoustic signals are continuously received by the sensor array 1 along with data corresponding to array position. The acoustic signals and position information regarding the location of the sensor array are transmitted to a data processing unit 11 for data processing. The acoustic signals are transmitted using, for example, an antenna and a wireless interface conforming to IEEE-802.11 b or 900 MHz spread spectrum systems known to have a reliable range of three to four miles. Alternatively, the sensor array 1 may be hardwired to data processing unit 11. Position information is transmitted using a GPS tracking system or similar mechanism. Alternatively, position information can be hard programmed into a memory of data processing unit 11.

The data processing unit 11 includes amplifiers 3 to amplify signals received by the data processing unit 11 from each of the acoustic transducers; an antialiasing filter with a low pass cutoff frequency of 250 kHz; high-speed A/D converters 5 to convert signals output by the amplifiers into digital data; a data acquisition daughter card 7 including nonvolatile memory for storing data, the nonvolatile memory including, e.g., waveform data; several buffers, e.g., acquisition buffers, microphone buffers and full frame buffers; a Real Time Clock for providing the date-time stamp of the alarm, the Real Time Clock is memory mapped to the DSP and is powered by a Lithium Ion battery with a life of 5 years; a digital signal processor (DSP) 9 for processing the signals received by the sensor array 1, an Ethernet port 21 for connecting the system to the internet or local area network (LAN), a flash 29 for storing data corresponding to different sound of gunshots and ambient noises to be used when identifying the acoustic signals and waveform data, and serial ports 23 for connecting to auxiliary electronics, including but not limited to a PTZ video camera.

The operation of the data processing unit will now be described with reference to FIG. 3. In the first step 200, the hardware and software connected to the system are initialized. Next, in step 202, audio signals received from the sensor array 1 are amplified and converted to digital data by the high-speed A/D converters 5. In the preferred embodiment, A/D converters sample the amplified signal at a frequency of 500 kHz with 16 bit resolution. The sampling rate of 500 kHz per channel is important in terms of the granularity of the time delays estimated. The digital sample data is saved in the aforementioned memory. Alternatively, or additionally, the raw wave data is saved in memory prior to A/D conversion. This saved data can be used for refining the waveform analysis, and allows for the ability to try additional preprocessing methods, e.g., the computation of Mel Frequency Cepstral Coefficients instead of wavelet decomposition and coefficient reconstruction, which serve as the feature vector input to the DSNN. In step 204, the DSP 9 ensures that a proper amount of sample data is acquired for each microphone, e.g., channels 0, 1, 2 and 3, and if enough sample data is acquired, begins processing the samples in step 206. In processing the sample data, samples from the acquisition buffer of the memory are de-interleaved and stored in individual microphone buffers.

There are 16384 samples, or 32 milliseconds of sample data, stored in each individual microphone buffer and three microphone buffers for each individual microphone are part of the acquisition memory. Each microphone buffer stores a consecutive 32 milliseconds of sample data for each channel. When all microphone buffers for a particular channel are full, the microphone buffer containing the oldest sample data replaces the old sample data with new sample data corresponding to the latest 32 milliseconds of time.

Data stored in a microphone buffer for channel 0, i.e., the origin microphone, is evaluated using the following:
low pass filter
$4^{th}$ order IIR high pass filter (to eliminate wind noise),
maximum amplitude value, and
root mean square (RMS) for the entire microphone buffer of channel 0 being evaluated;

to determine whether the data meets threshold conditions. If all of the above threshold conditions are met, the three microphone buffers are consolidated into a single buffer for each microphone buffer, named the full frame buffer. The full frame buffer for channel 0 is then processed to slice out 16384 samples with the highest amplitude sample being in the center. The start index of this new buffer is calculated by taking the highest amplitude sample and moving forward 16 milliseconds and back 16 milliseconds. The 16384 samples from the full frame buffers for each of channel 1, channel 2 and channel 3 are sliced out with the same start index, i.e., moving forward and backward 16 milliseconds from a sample time corresponding to the time of the highest amplitude sample for channel 0. This entire process is called Tri-Frame Analysis.

Figure 4:
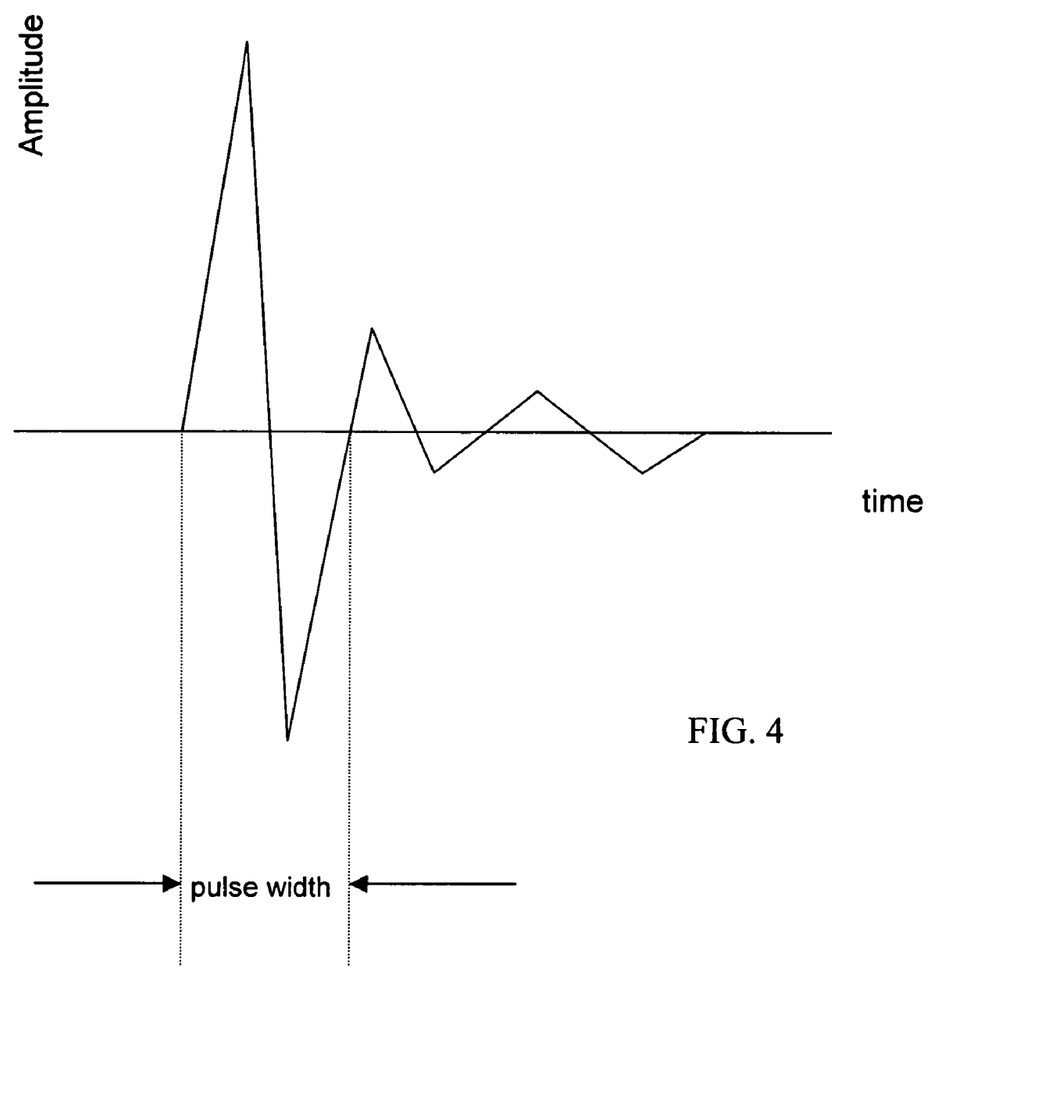
FIG. 4 is a gunshot waveform time-domain model.
Figure 5A:
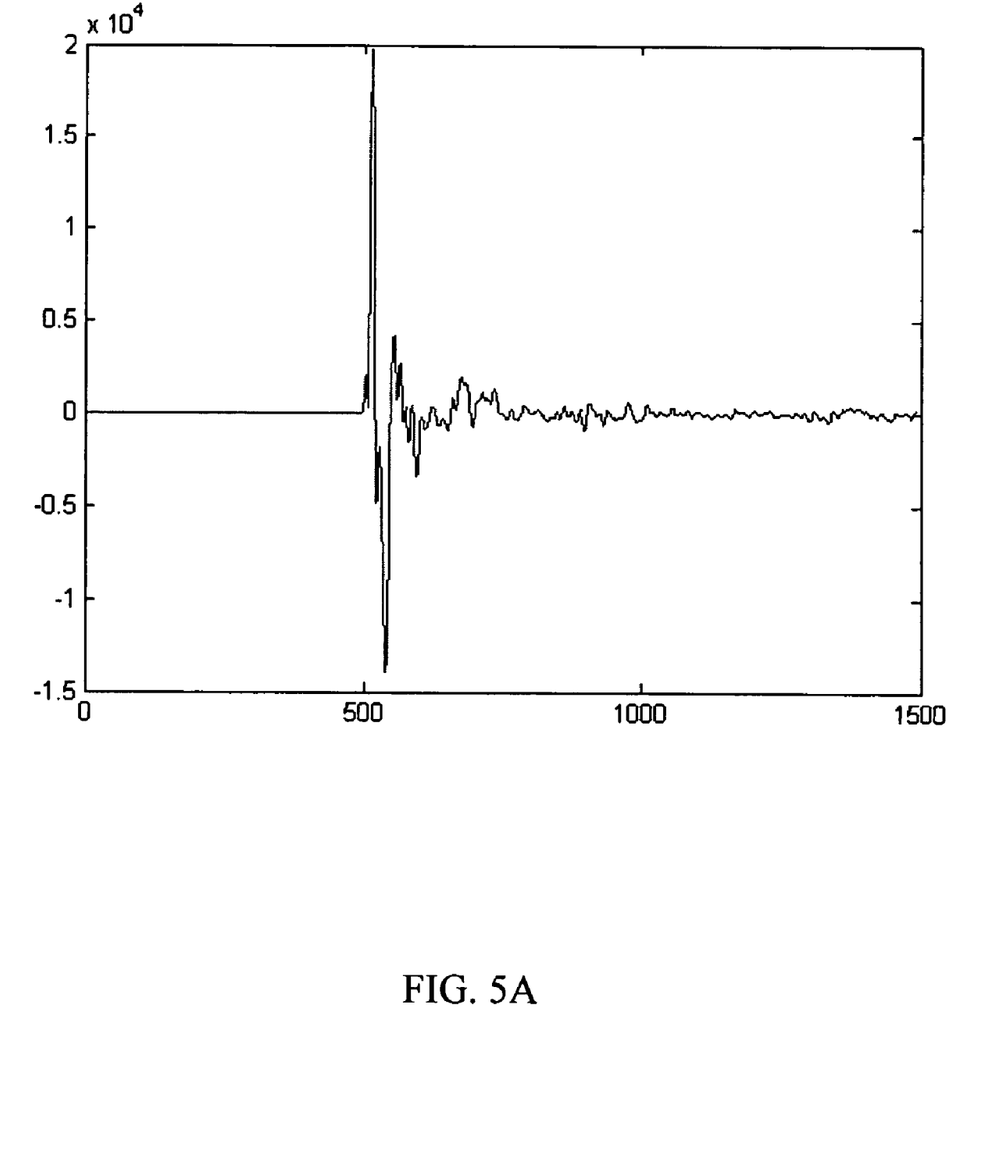
FIG. 5A show the time-amplitude waveform of a gunshot detected by a sensor according to the present invention.
Figure 5B:
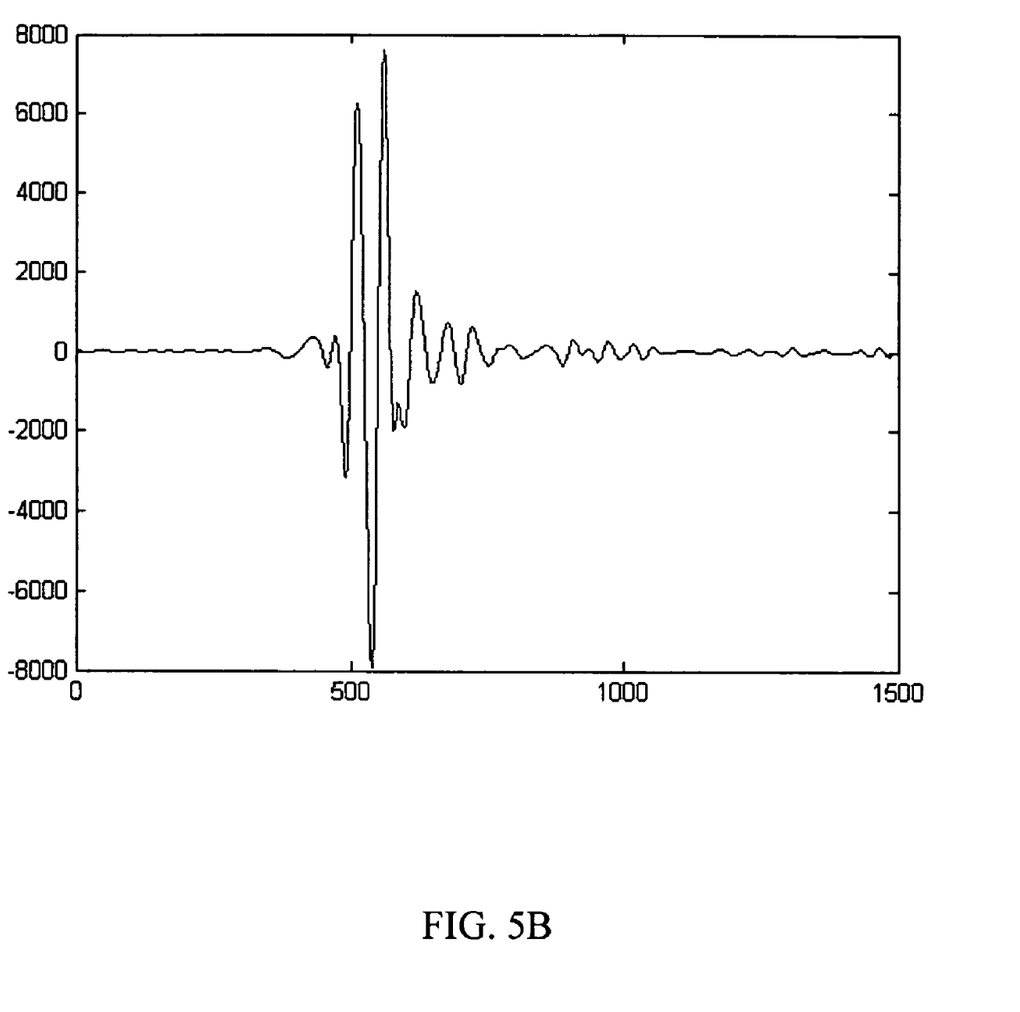
FIG. 5B shows the wavelet decomposed and reconstructed coefficients for level 5, of the signal in FIG. 5A according to the present invention.
Figure 5C:
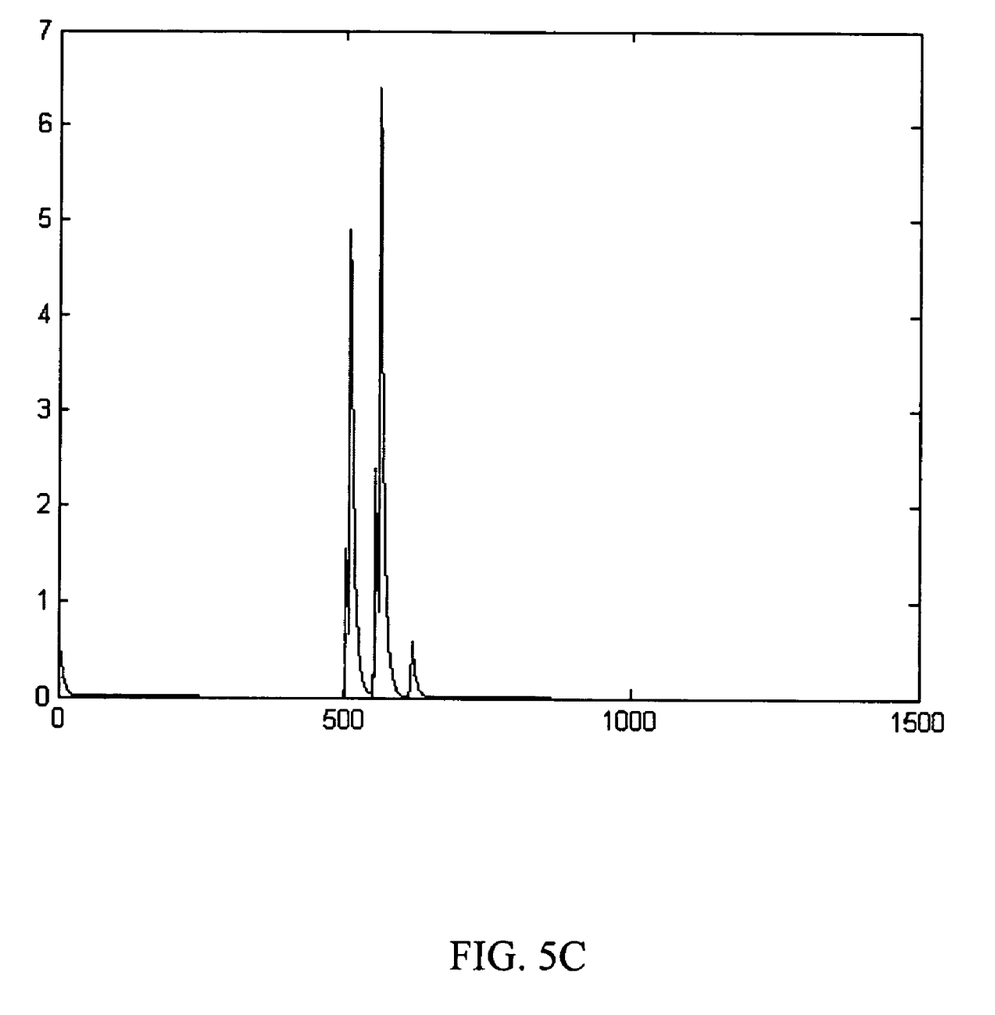
FIG. 5C shows the variable exponential thresholding function derived from the waveform in FIG. 5B according to the present invention.
Figure 5D:
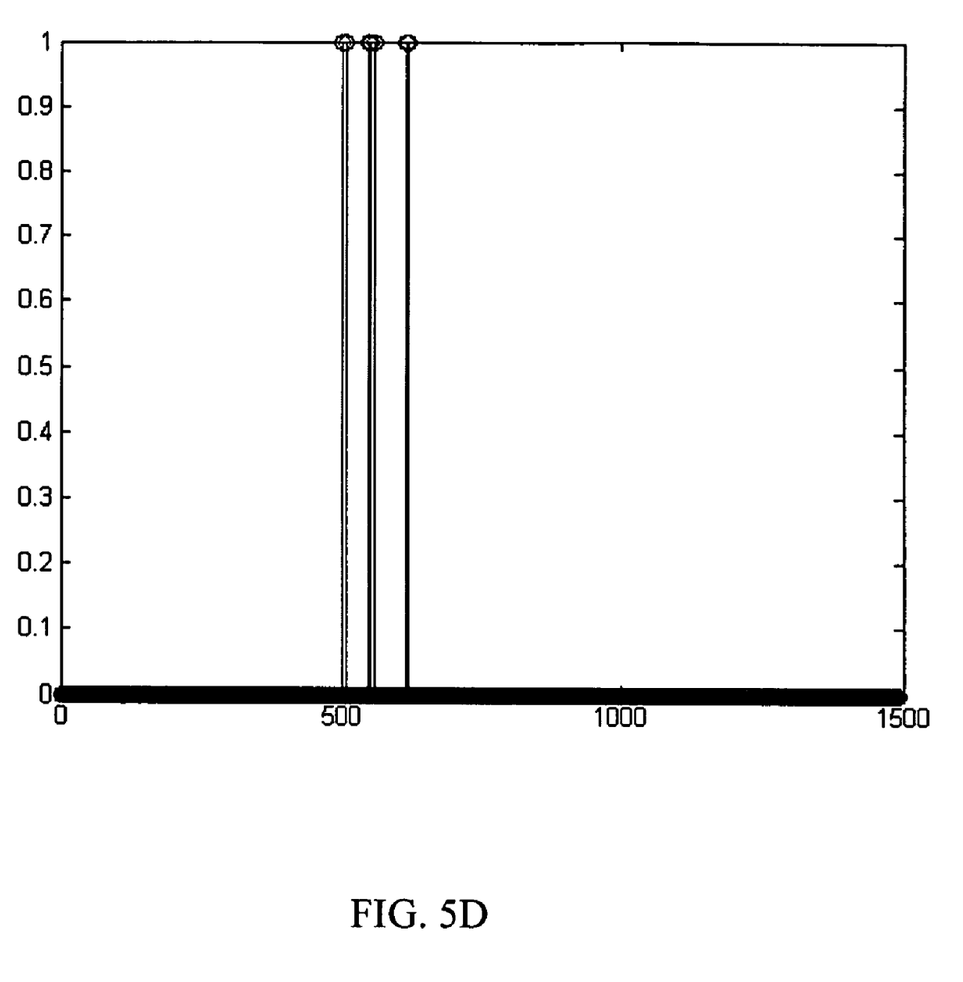
FIG. 5D shows the pulsatile input to a dynamic synapse neural network (DSNN) derived by thresholding the waveform in FIG. 5B with the thresholding function in FIG. 5C according to the present invention.

In the preferred embodiment of the invention, the waveform analysis performed in step 210 is a time-domain model fit for a gunshot waveform derived from the analysis of a number of gunshot waveforms. The shape of the gunshot waveform is subject to the following parameters: pulse width, peak waveform amplitude, ratio of the positive peak to the negative peak of the N of the gunshot pulse, and slope of the N of the gunshot pulse. An Average Magnitude Difference Function commonly used in speech signal processing to determine the pitch (fundamental frequency) of a waveform is used to determine if there is periodicity in the waveform.

After the waveform is analyzed in step 210, the waveform is classified using a dynamic synapse neural network (DSNN). The following description of the DSNN uses the terms "neuron" and "signal processor", "synapse" and "processing junction", "neural network" and "network of signal processors" in a roughly synonymous sense. Biological terms "dendrite" and "axon" are also used to represent the input terminal and the output terminal of a signal processor, i.e., "a neuron." A DSNN according to the preferred embodiment of the instant invention has the ability to continuously change the amount of response to a received pattern according to a temporal pattern and magnitude variation of the received waveform. Preferably the DSNN comprises a DSNN as described in prior U.S. Pat. No. 6,643,627 to Liaw et al.

More particularly, the DSNN of the preferred embodiment of the instant invention is a pulsed neural network that is trained to classify waveform data corresponding to signals received by each of the acoustic transducers into a class of gunshots and a class of noises. The DSNN is trained to classify gunshot sounds of 12 different type of caliber guns and a 6 mm starter pistol (for demonstration purposes) as the class of gunshots, and sounds including claps, fire crackers, whistles, stones being dropped, a key bunch being dropped, PVC and metal pipe banging, speech, stretch and release of a rubber glove and a low frequency foghorn sound as the class of noises.

The DSNN according to a preferred embodiment of the invention has 7 input neurons and 3 output neurons of which one is an inhibitory interneuron i.e. provides an inhibitory feedback input to the presynaptic mechanism. The other features of the presynaptic mechanism are neurotransmitter release and two components of facilitation. The neuron is of the integrate and fire type. The input neurons receive a 1 or a 0 input corresponding to the 6 detail levels and 1 approximation level of wavelet decomposition and wavelet coefficient reconstruction. The wavelet decomposition and reconstruction is done by means of an aperiodic discrete wavelet transform and the periodic inverse discrete wavelet transform, respectively. The high-pass and low-pass filters for the wavelet decomposition and reconstruction are 20-coefficient Daubechies filters. The frame size for the wavelet decomposition is set at 1490 which results from a 1 in 11 down sampling of a buffer of length N=16384 of the 500 kHz sampled microphone signal. Therefore the input sampling rate to the DSNN is 45.45 kHz. A variable exponential thresholding function derived from the wavelet decomposed and reconstructed coefficients is applied on the 7 streams of reconstructed wavelet coefficients with a 1 being substituted for the sample when the threshold is exceeded and a 0 otherwise. The output of the thresholding stage is the action potential input to the input neurons of the DSNN.

The DSNN is trained by a Genetic algorithm on exemplars from the 12 gunshot classes, the starter pistol class and the class of noises. The trained DSNN parameters are stored in the flash memory along with the secondary boot loader program.

After, the data is classified using a DSNN in step 212, step 214 determines whether a gunshot was detected. If the result of step 214 is that a gunshot was detected, then in step 216 the DSP triangulates the signals received by the acoustic transducers, calculate the azimuth and elevation of the signal, and transmits corresponding data to the serial port e.g., to turn on a video camera to capture video data, and to a Ethernet port for connection to the internet or a LAN.

In detail, according to a preferred embodiment of the instant invention, step 216 determines the spatial location of a gunshot using Sound Triangulation (ST). To analyze and determine the location of the gunshot using ST, the following information is used:
1. Intensity of gunshot pulse (RMS value as picked up from acoustic sensor) as picked up by 4 Microphones in the range of 5–320 yards, and
2. Time differences of arrival of the gunshot sound at each of three microphone pairs.

Figure 2:
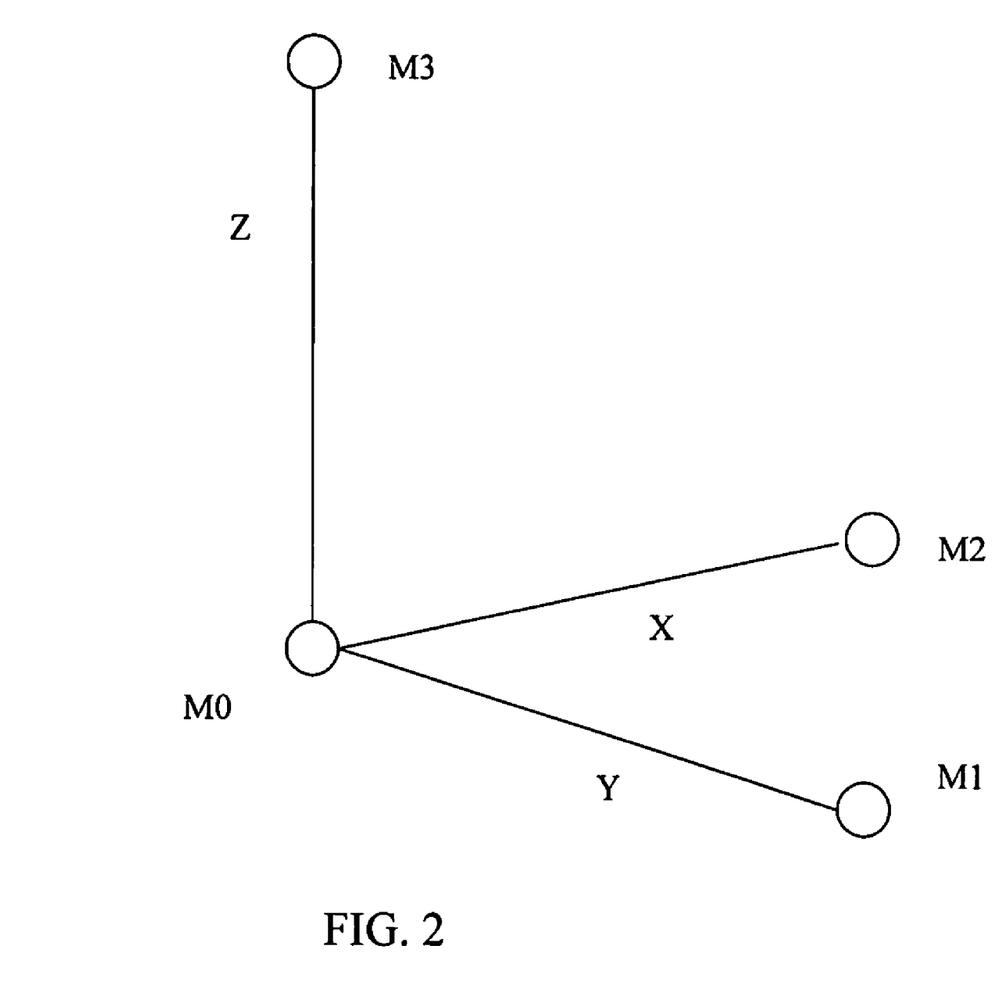
FIG. 2 is a diagram of the microphone array.

Four acoustic transducers M0, M1, M2 and M3 are used as shown in FIG. 2. The coordinates of M0, M1, M2 and M3 are known. The acoustic transducers are placed on the Cartesian coordinate axes with transducer M0 is the origin microphone and placed at the origin, transducers M1 and M2 are the periphery microphones are placed on the XY plane and transducer M3 is the fourth microphone and is placed on the Z-axis. All transducers are preferably at a distance of 0.39 m from the origin microphone, M0. Using differences in the arrival time of the gunshot sound wave at each of the three transducer pairs, M0M1, M0M2 and M0M3, the azimuth and elevation of the gunshot source are calculated. From the elevation and the height of origin microphone M0, the distance between the gunshot source and origin microphone M0 is calculated.

The time for the sound wave to travel between the gunshot source and any of the acoustic transducers is unknown but the difference in time when the sound wave reaches any two acoustic transducers of a pair of transducers can be measured. In other words, if the source emits a signal at time t=0, the four acoustic transducers will sense the signals at the unknown absolute times $t_1$, $t_2$, $t_3$, and $t_4$. The time differences of arrival at M0 and M1 ($t_{12}=t_1-t_2$), M0 and M2 ($t_{13}=t_1-t_3$) and M0 and M3 ($t_{14}=t_1-t_4$) is Computed and the azimuth and elevation of the source are estimated as follows:

$$\text{Azimuth}=(180/\pi)*\tan^{-1}(t_{13}/t_{12}) \text{ in degrees}.$$

if (Azimuth<0) Azimuth=Azimuth+360

$$\text{Elevation}=(180/\pi)*|(\tan^{-1}(td_{14}/\text{sqrt}(t_{12}*t_{12}+t_{13}*t_{13})))|, \text{ in degrees}.$$

The range or the distance between microphone M0 and the gunshot source can then be calculated as, $$\text{Range}=h/\tan(\text{Elevation}),$$

where h is the height of the origin microphone, M0.

The time difference of arrival of the gunshot sound wave at a microphone pair is calculated by computing the generalized cross-correlation of the signals that are sampled at the acoustic transducers in the pair. The generalized cross-correlation between two signals is computed in three steps: First the Fast Fourier Transform (FFT) of the signals are computed—for transducers M0 and M1, let the complex FFT outputs be H1(w) and H2(w) where w indicates frequency. In step 2, the frequency spectra are multiplied i.e. H1(w)×H2(w) is computed. In step 3, the inverse FFT of the multiplication result of the previous step is computed to give the generalized cross-correlation function. The time lag corresponding to the peak in the cross-correlation function is the time difference of arrival of the gunshot sound wave at the two acoustic transducers. If an N-point FFT is used to compute the cross-correlation, then lag 0 corresponds to index 1 of the cross-correlation function, and the positive lags 1 to N/2−1 range from indices 2 to N/2 respectively, with negative lags −N/2+1 to −1 ranging from indices N/2+1 to N−1. In the case of this implementation, N=16384.

In general, certain components of the acoustic event location and classification system of the invention discussed above can be implemented in software (e.g., firmware), hardware, or a combination thereof. In the currently contemplated best mode, certain components of the acoustic event location and classification system are implemented in software, as an executable program, and is executed by a DSP.

The DSP is a hardware device for executing software, particularly that stored in a memory. The DSP can be any custom made or commercially available processor, a central processing unit (CPU), an auxiliary processor among several processors associated with the computer, a semiconductor based microprocessor (in the form of a microchip or chip set), a macroprocessor, or generally any device for executing software instructions. Examples of suitable commercially available microprocessors are as follows: a PA-RISC series microprocessor from Hewlett-Packard Company, an 80×86 or Pentium series microprocessor from Intel Corporation, a PowerPC microprocessor from IBM, a Sparc microprocessor from Sun Microsystems, Inc, or a 68xxx series microprocessor from Motorola Corporation.

The memory can include any one or combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory may incorporate electronic, magnetic, optical, and/or other types of storage media. Note that the memory can have a distributed architecture, where various components are situated remote from one another, but can be accessed by the DSP.

The software in the memory may include one or more separate programs, each of which comprises an ordered listing of executable instructions for implementing logical functions. In the example of FIG. 1, the software in the memory includes certain components of the acoustic event location and classification system in accordance with the present invention.

Certain components of the acoustic event location and classification system are source program, executable program (object code), script, or any other entity comprising a set of instructions to be performed. When a source program is created, the program needs to be translated via a compiler, assembler, interpreter, or the like, which may or may not be included within the memory. Furthermore, certain components of the acoustic event location and classification system can be written as (a) an object oriented programming language, which has classes of data and methods, (b) a procedure programming language, which has routines, subroutines, and/or functions, for example but not limited to, C, C++, Pascal, Basic, Fortran, Cobol, Perl, Java, and Ada, or (c) an assembly language.

When certain components of the acoustic event location and classification system are implemented in software, it should be noted that certain components of the acoustic event location and classification system can be stored on any computer readable medium for use by or in connection with any computer related system or method. In the context of this document, a computer readable medium is an electronic, magnetic, optical, or other physical device or means that can contain or store a computer program for use by or in connection with a computer related system or method. Certain components of the acoustic event location and classification system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In an alternative embodiment, where certain components of the acoustic event location and classification system are implemented in hardware, certain components of the acoustic event location and classification can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Although the present invention has been described in detail with reference to the preferred embodiments, various modifications and enhancements can be made without departing from the spirit and scope of the invention.

What is claimed is:

1. An acoustic event location and classification system comprising,
    an array of at least two acoustic transducers arranged spaced from one another;
    a central data processing unit for receiving signals from said acoustic transducers and processing said signals to determine a event type and location; and
    an internet or LAN connection for transmitting event type and location data to a third party,
    wherein said central data processing unit uses a dynamic synapse neural network (DSNN) to determine the event type and generalized cross correlation between pairs of acoustic transducers to determine the event location.

2. The acoustic event location and classification system of claim 1 wherein said transducers are equi-spaced from one another.

3. The acoustic event location and classification system of claim 1 comprising four transducers.

4. The acoustic event location and classification system of claim 1 wherein said transducers are spaced less than about 1.2 feet apart.

5. The acoustic event location and classification system of claim 1 wherein said array is portable.

6. The acoustic event location and classification system of claim 1 wherein said array is worn on a human body.

7. The acoustic event location and classification system of claim 1 wherein said array is worn on a helmet.

* * * * *